(12) United States Patent
Bandy et al.

(10) Patent No.: US 10,656,358 B2
(45) Date of Patent: May 19, 2020

(54) FIBER OPTIC NETWORK DISTRIBUTION MODULE FOR USE ALONG AN OUTDOOR MULTI-FIBER NETWORK DISTRIBUTION CABLE

(71) Applicant: OFS Fitel, LLC, Norcross, GA (US)

(72) Inventors: James C Bandy, Duluth, GA (US);
Denis E Burek, Cumming, GA (US);
Xavier Chiron, Atlanta, GA (US);
Lynda Price, Oakwood, GA (US);
Willard C White, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/935,222

(22) Filed: Mar. 26, 2018

(65) Prior Publication Data

US 2019/0033546 A1 Jan. 31, 2019

Related U.S. Application Data

(60) Provisional application No. 62/643,886, filed on Mar. 16, 2018, provisional application No. 62/536,627, filed on Jul. 25, 2017.

(51) Int. Cl.
*G02B 6/44* (2006.01)
(52) U.S. Cl.
CPC ......... *G02B 6/4452* (2013.01); *G02B 6/4444* (2013.01); *G02B 6/4446* (2013.01); *G02B 6/4454* (2013.01)
(58) Field of Classification Search
CPC .................. G02B 6/4452; G02B 6/00
USPC .................................. 385/135, 147
See application file for complete search history.

(56) References Cited

U.S. PATENT DOCUMENTS

| | | | | |
|---|---|---|---|---|
| 5,420,957 A | * | 5/1995 | Burek | G02B 6/4446 385/135 |
| 5,862,290 A | * | 1/1999 | Burek | G02B 6/3801 385/134 |
| 5,896,486 A | * | 4/1999 | Burek | G02B 6/4446 385/135 |
| 5,907,653 A | * | 5/1999 | Burek | G02B 6/3801 385/135 |
| 6,151,436 A | * | 11/2000 | Burek | G02B 6/4447 385/134 |
| 6,672,191 B2 | | 1/2004 | Lin | |
| 7,082,252 B1 | * | 7/2006 | Huffman | G02B 6/266 385/140 |

(Continued)

*Primary Examiner* — Akm E Ullah
(74) *Attorney, Agent, or Firm* — Law Offices of Leo Zucker (57) ABSTRACT

An optical fiber distribution module includes a base having a surrounding wall, a cover, and a sealing element in the cover. A pair of cable ports are formed in the base wall to pass an outdoor fiber distribution cable through an interior region of the module. One or more fiber ports in the wall pass corresponding drop fibers from the interior region where the fibers connect to designated fibers of the distribution cable, to a number of premises for which the fibers are designated inside a multi-dwelling unit building. Grommet seals are dimensioned and formed to be inserted in any unused fiber ports, and to surround the distribution cable and the drop fibers in their corresponding ports. The grommet seals cooperate with the sealing element in the cover to seal all the ports from the environment when the module is closed.

12 Claims, 10 Drawing Sheets

(56) References Cited

U.S. PATENT DOCUMENTS

| | | | |
|---|---|---|---|
| RE42,258 E * | 3/2011 | Thompson | G02B 6/4452 174/50 |
| 8,315,057 B2 | 11/2012 | Xu et al. | |
| 8,842,445 B2 * | 9/2014 | Anderson | G02B 6/4452 361/826 |
| 9,261,663 B2 * | 2/2016 | Loeffelholz | G02B 6/4453 |
| 9,632,267 B1 | 4/2017 | Burek et al. | |
| 9,904,026 B2 * | 2/2018 | Burek | G02B 6/4441 |
| 10,139,582 B2 * | 11/2018 | Burek | G02B 6/4441 |
| 10,488,613 B2 * | 11/2019 | Boxer | G02B 6/4436 |
| 10,527,811 B2 * | 1/2020 | Burek | G02B 6/3897 |
| 2017/0052339 A1 | 2/2017 | Loeffelholz et al. | |
| 2017/0285272 A1 | 10/2017 | Burek et al. | |

* cited by examiner

FIBER OPTIC NETWORK DISTRIBUTION MODULE FOR USE ALONG AN OUTDOOR MULTI-FIBER NETWORK DISTRIBUTION CABLE

CROSS REFERENCE TO RELATED APPLICATIONS

This application claims priority under 35 U.S.C. § 119(e) of U.S. Provisional Patent Applications No. 62/536,627 filed Jul. 25, 2017, titled "INVISILIGHT® In-Line Outside Plant Closure," and No. 62/643,886 filed Mar. 16, 2018, titled "Façade Outside Plant Inline Closure," the entire contents of both applications being incorporated herein by reference.

BACKGROUND OF THE INVENTION

Field of the Invention

The present invention relates to modules for enclosing optical fibers and cables, and particularly to modules that manage and store connections of fibers contained in a network distribution cable, with fibers of drop cables associated with individual network users or premises inside a multiple dwelling unit (MDU) building.

Discussion of the Known Art

Multi-fiber optical network distribution cables are frequently installed along hallway walls inside a MDU building to enable occupants of premises in the building to access a fiber optic network. Fibers of the distribution cables are designated for corresponding premises that are located adjacent to or near the hallway walls along which the cables are installed.

In a typical installation, a point-of-entry (POE) fiber access module is mounted on the hallway wall outside of each premises, and the distribution cable is routed along the wall so it can be passed through the module interior. A short length of the cable jacket is opened, and a fiber that has been designated for the premises is identified and removed from the cable. The designated fiber is connected inside the module to a drop fiber that is routed to pass from inside the module and through the hallway wall to enter the premises. The connection is made, for example, by terminating each of the drop fiber and the designated fiber with an optical connector, and coupling the two connectors to one another through an adapter that is mounted inside the module. See U.S. Pat. No. 9,632,267 (Apr. 25, 2017) and U.S. Pub. No. 2017/0285272 (Oct. 5, 2017), both of which are assigned to the present applicant and are incorporated by reference. The connections of the designated fibers to the drop fibers can also be achieved using known fusion splicing procedures, wherein the fused ends of the fibers are surrounded by protective sleeves, and the sleeves are retained in a tray inside the module.

Occasions arise, however, where hallways or other pathways allotted for fiber network distribution cables inside a MDU building are fully occupied or congested. For example, new premises may become available along a given hallway, but all of the fibers in the existing hallway distribution cable are designated for other premises. Also, the building owner may not allow a second distribution cable to be installed along the hallway, or for the existing cable to be replaced by one with a higher fiber count.

U.S. Pat. No. RE 42,258 (Mar. 29, 2011) relates to an outside plant fiber distribution apparatus including a frame, and a number of fiber optic modules including connection, storage, and blank modules that are selected to fill the frame with desired functions. U.S. Pat. No. 6,792,191 (Sep. 14, 2004) discloses an outdoor cabinet for interconnecting an optical fiber of a feeder cable with at least two fibers of a distribution cable at a local network convergence point. Other cabinets or enclosures for storing and interconnecting fiber optic distribution cables with other cables or fibers are disclosed in U.S. Pat. No. 8,315,057 (Nov. 20, 2012) and U.S. Pub. No. 2017/0052339 (Feb. 23, 2017). The mentioned patents and published patent application are also incorporated by reference.

Notwithstanding the known art, there is a need for an outdoor optical fiber module that can manage fibers of a network distribution cable that is routed outside of a MDU building, wherein (a) one or more like modules are installed in-line along the length of the cable, (b) designated fibers of the cable can be connected inside the module to drop fibers that run from the module to corresponding premises inside the building, and (c) the distribution cable, the designated fibers, and the drop fibers are protected from the outdoor environment when the module is closed. Moreover, if the building owner will not allow the module to be mounted on or otherwise physically attached to an outside wall or façade of the building, the module must be light enough to be supported by the distribution cable alone, without impairing the mechanical integrity of the cable or the fiber connections inside the module.

SUMMARY OF THE INVENTION

According to the invention, an optical fiber distribution module includes a base, a cover, and a sealing element disposed in the cover. A pair of cable ports are formed in the base wall at opposite sides of the base for passing an outdoor fiber distribution cable through the interior region of the module.

One or more fiber ports are formed in the base wall for passing drop fibers from the interior region of the module where the drop fibers can connect to fibers of the distribution cable that are designated for certain premises inside a multi-dwelling unit (MDU) building, so that the drop fibers can be routed from the module to the premises for which the fibers of the distribution cable are designated.

First grommets are associated with the fiber ports. Each first grommet is dimensioned and formed to be urged into an unused fiber port, and to cooperate with the sealing element of the module cover for sealing the unused fiber port from an outdoor environment when the module is closed.

Second grommets are associated with both of the cable and the fiber ports. The second grommets have openings dimensioned to pass the distribution cable and the drop fibers, and to surround the distribution cable and the drop fibers in sealing relationship when the grommet is urged into a corresponding port. The second grommets also cooperate with the sealing element of the module cover for sealing the port from the outdoor environment when the module is closed.

It will be appreciated that the inventive module offers a reliable, cost effective, outdoor solution when (a) one or more fibers of an existing indoor network distribution cable need to be assigned to new premises inside a MDU building, but all of the fibers in the cable are designated for other premises, and (b) a second distribution cable with enough fibers to designate for the new premises cannot be installed indoors.

For a better understanding of the invention, reference is made to the following description taken in conjunction with the accompanying drawing and the appended claims.

DETAILED DESCRIPTION OF THE INVENTION

The present invention provides a solution in case an existing fiber optic network distribution cable inside a MDU building has no fibers available for servicing new premises or users in the building. In addition to installing or suspending an outdoor network distribution cable adjacent to the building, one or more outdoor optical fiber distribution modules according to the invention are installed in-line along the cable. Drop fibers are connected to designated cable fibers inside each module. The drop fibers are passed through ports of each module, through an outside wall of the building, and to the premises inside the building to be serviced by the fibers. The module is relatively inexpensive, weather resistant, and lightweight so it can be readily mounted to the building outside wall along with the distribution cable, or hung aerially on the cable if the cable is suspended at a distance from the outside wall.

Distribution cables capable of deployment outdoors include, inter alia, 12-fiber cables available from OFS Fitel, LLC under the registered trademarks Accudry® and M-Pack®, and 24-fiber M-Pack cables. The cables can be clipped to an outside building wall similar to a coaxial cable TV run, using just screws and plastic cable retainers. For example, at periodic locations along the cable, the cable jacket can be slit open a first time, approximately 28 inches from a deployment point where a module according to the invention will be installed on the cable. A number of cable fibers to be designated for the premises inside the building can then be identified and cut through the open slit by a conventional cutting tool.

At each deployment point along the distribution cable, the cable jacket can be slit open a second time, lengths of those cable fibers that were cut through the first slit can be withdrawn through the second slit and terminated in connectors, and the connectors mated to corresponding adapters inside the module. Drop fibers associated with the premises in the building are also connectorized and mated to the adapters, and the drop fibers are routed from the module to the premises through pathways in an outside building wall or façade. Instead of using connectors and adapters, and as noted earlier, the ends of the drop fibers can be fusion spliced on site to the ends of the fibers withdrawn from the distribution cable, and the fused ends of the spliced fibers sleeved and retained in trays inside the module.

If the module is being mounted directly on an outside wall of the building, a hole can be drilled far enough through the wall to open inside the premises, or inside a duct or channel that leads to the premises inside the building. The hole should be located away from the module footprint to facilitate routing and bending of the drop fibers. The drop fibers are then passed from the module, through the hole, and routed inside the building to the associated premises. Drop fibers that are jacketed with outer diameters of 3.0 mm, 3.8 mm, and 4.8 mm and which are suitable for outdoor deployment include, e.g., 12 and 24 fiber M-Pack EZ Bend®, 12 fiber Allwave Accudry®, and single fiber interconnect EZ Bend, all of which are available from OFS Fitel, LLC.

Figure 1:
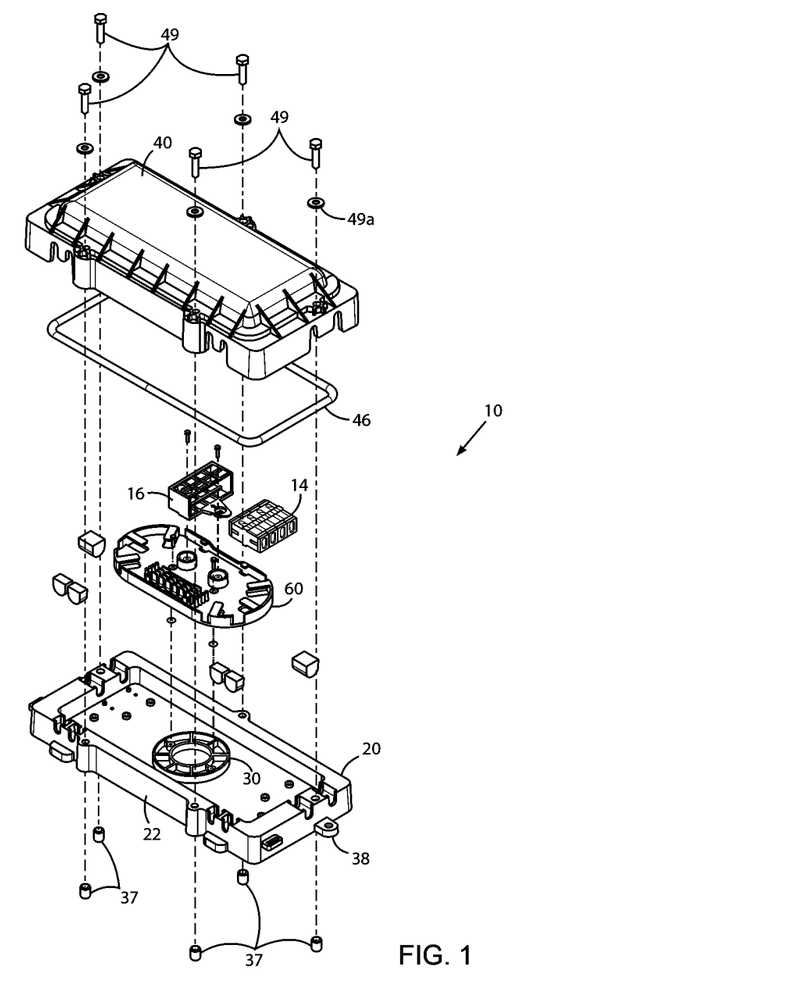
FIG. 1 is an assembly view of a first embodiment of an outdoor optical fiber distribution module according to the invention.
Figure 2:
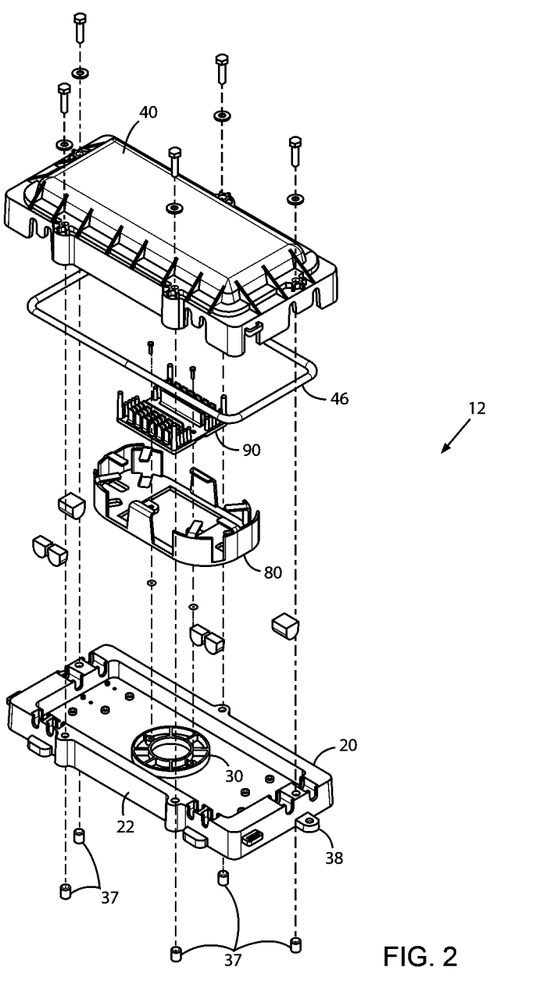
FIG. 2 is an assembly view of a second embodiment of an outdoor optical fiber distribution module according to the invention.

FIG. 1 is an assembly view of a first embodiment of an outdoor optical fiber distribution module 10 according to the invention, and FIG. 2 is an assembly view of a second embodiment of an outdoor optical fiber distribution module 12 according to the invention. In the disclosed embodiments, module 10 is constructed and arranged to retain up to six fusion splices within, e.g., 45 mm long splice sleeves, and to mount up to four adapters 14 in an adapter holder 16 for coupling connectors at the ends of the drop fibers and cable fibers to one another. The adapters 14 may be formed to accept, for example, simplex SC APC or duplex LC APC type connectors. Module 12 is constructed and arranged to retain up to 24 fusion splices within 45 mm long splice sleeves.

As described below, each of the modules 10, 12 has two cable ports for passing a distribution cable through an interior region of the module where certain designated fibers of the cable are managed, and six fiber ports for passing jacketed drop fibers from the module to be routed to corresponding premises inside a MDU building. In addition to meeting certain standards noted below, the modules 10, 12 should comply with industry standards IP56 and IK06 for ingress and impact protection when the modules are closed and installed outdoors.

Figure 3:
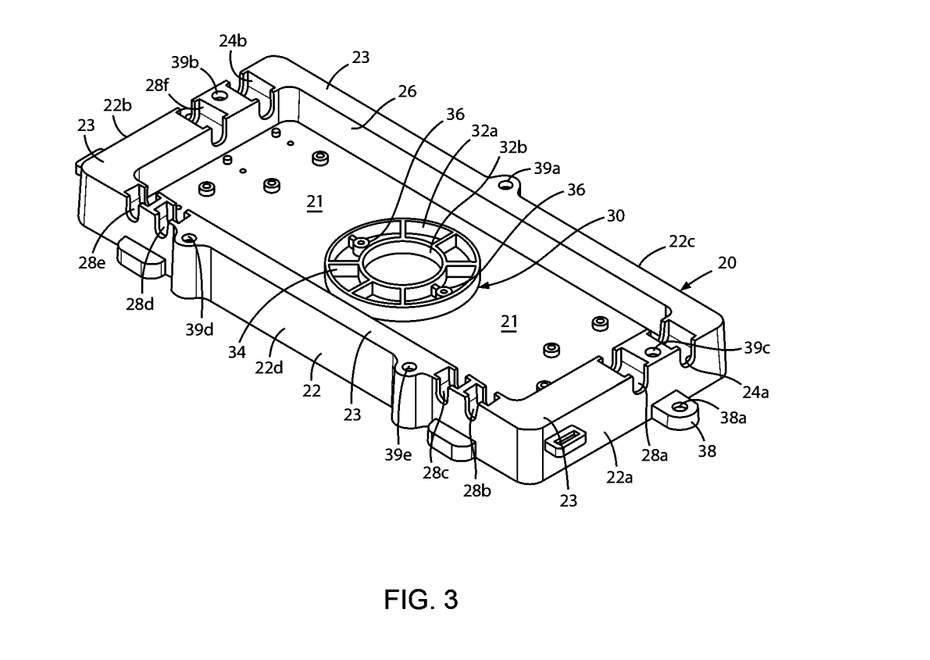
FIG. 3 is an enlarged isometric view of a base of the inventive distribution modules shown in FIGS. 1 and 2.

Each module 10, 12 has a generally rectangular base 20, an enlarged view of which is shown in FIG. 3. The base 20 measures, for example, approximately 9.061 inches in length and approximately 3.975 inches in width. The base also has a surrounding wall 22 that extends vertically upward approximately 0.825 inch in overall height as viewed in the drawing. Base 20 can be formed of a UV resistant and RoHS compliant material such as, e.g., glass fiber reinforced polypropylene.

The base wall 22 has a pair of distribution cable ports 24a, 24b formed in first and second short sides 22a, 22b of the wall 22, and near a first long side 22c of the wall as shown in FIG. 3. The ports 24a, 24b enable an outdoor distribution cable to pass straight through an interior region 26 of each module 10, 12. Ports 24a, 24b are in the form of generally U-shaped notches that extend downward from the top of the wall 22, wherein the bottom of each port rounded. The side walls of each cable port may be slightly inclined slightly toward one another from the top of the base wall, so as to form a tight weatherproof seal with the jacket of a distribution cable when the cable is urged toward the bottom of the port.

Base wall 22 also has six fiber ports 28a-e, two of which (28a and 28e in FIG. 3) are also formed in the first and second short sides 22a, 22b of the wall, and near cable ports 24a, 24b as shown in FIG. 3. Two fiber ports 28b, 28c are formed next to one another in a second long side 22d of the base wall 22, and close to the first short side 22a of the wall. The other two fiber ports 28d, 28e are also formed next to one another in the second long side 22d of the base wall 22, and close the second short side 22b of the wall. Like the distribution cable ports 24a, 24b, the fiber ports 28a-e are in the form of generally U-shaped notches that extend downward from the top of the base wall 22, wherein the bottom of each port is rounded. The side walls of each fiber port are also slightly inclined toward one another from the top of the base wall, so as to form a tight weatherproof seal with the jacket of a drop fiber when the fiber is urged toward the bottom of the port.

Accordingly, the fiber ports 28a-e allow corresponding drop fibers to pass from the interior region 26 of the module base 20 where the fibers are connected to designated fibers of the distribution cable, to those premises inside a MDU building for which the fibers are designated. It will be understood, however, that fewer or more than six fiber ports may be formed in the base wall 22 depending on, inter alia, a greatest number of drop fibers that are expected to be handled by any one of the inventive modules 10, 12.

A circular boss 30 is formed at the center of the interior region 26 of the module base 20. See FIGS. 1, 2, and 3. In the disclosed embodiments, the boss 30 is defined by two concentric circular rings 32a, 32b, and wall segments 34 that extend radially between the rings 32a, 32b every 45 degrees. The rings 32a, 32b and the wall segments 34 project, for example, approximately 0.220 inch above the flat interior surface 21 of the base 20. Two of the wall segments 34 that are 180 degrees apart and are aligned parallel to the long axis of the base 20, are formed with rounded bosses 36 (see FIG. 3) that have holes for engaging mounting screws associated with certain interior components, described below. The boss 30 including the rings 32a, 32b and the wall segments 34 together define a secure mounting platform for the components.

Two mounting lugs 38, one of which is shown in FIGS. 1, 2, and 3, are disposed at the bottom of the module base 20. The lugs 38 project from opposite sides of the base, and each lug has a hole 38a for passing a screw or other fastener to mount the base 20 on a flat surface outdoors, e.g., an outside building wall or façade. If the building owner will not allow the modules 10, 12 to be physically attached to a wall or other exterior structure, then one or more modules can be supported solely by an outdoor distribution cable on which they are installed.

In addition, five openings 39a-e, shown in FIGS. 1 to 3, are formed vertically over the entire height of the wall 22 of the module base 20. One opening 39a is formed through a boss that protrudes from the long side 22c of the wall 22, midway over the length of the side 22c. Openings 39b, 39c are formed directly through the base wall 22 at locations between ports 24a, 28a on short side 22a of the wall, and between ports 24b, 28c on short side 22b of the base wall. Openings 39d, 39e are formed through corresponding bosses that protrude from the long side 22d of the base wall 22 near fiber ports 28b, 28c at one end of the long side 22d, and near fiber ports 28d, 28e at the other end of the side 22d. As shown in FIGS. 1 and 2, threaded sleeves 37 are press fit or otherwise retained inside the vertical openings 39a-e formed in the wall 22 of the module base 20.

Figure 4:
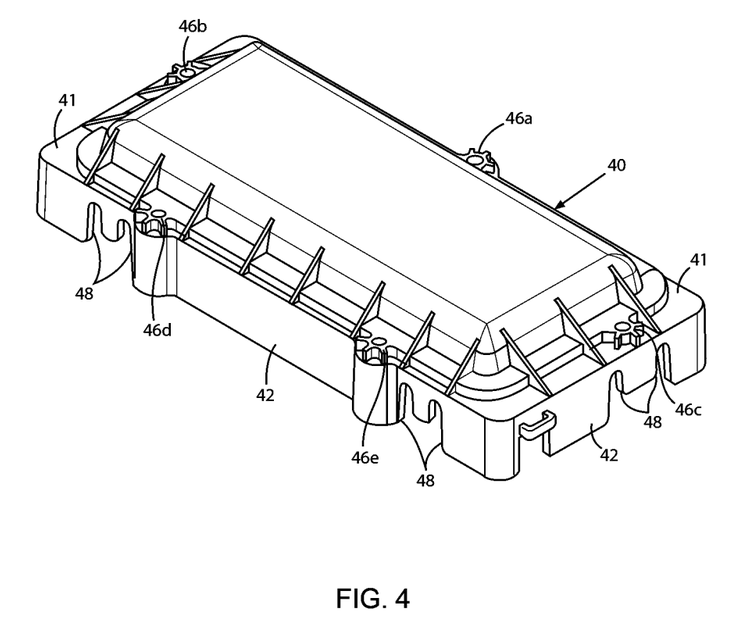
FIG. 4 is an enlarged isometric view of a cover of the inventive modules in FIGS. 1 and 2.
Figure 5:
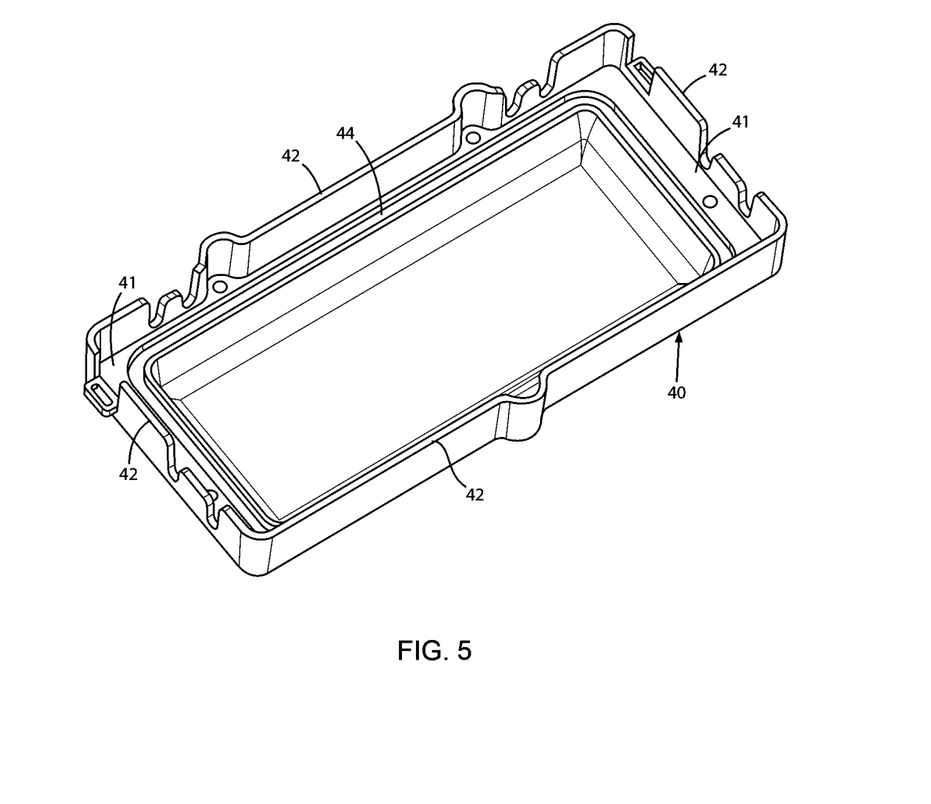
FIG. 5 is an enlarged bottom view of the cover of the inventive modules in FIGS. 1 and 2.

Each module 10, 12 also has a cover 40, top views of which are shown in FIGS. 1, 2, and 4. FIG. 5 is a bottom view of the module cover 40. The cover 40 measures, for example, approximately 9.277 inches in overall length and approximately 4.19 inches in overall width. The cover 40 has a surrounding flat lip 41, and a wall 42 that extends approximately 1.725 inches downward from the perimeter of the lip 41 as seen in FIG. 4. Like the module base 20, the cover 40 can be formed of a UV resistant and RoHS compliant material such as glass fiber reinforced polypropylene, or equivalent.

Five openings 46a-e are formed vertically over the entire height of the wall 42 of the module cover 40. One opening 46a is formed through a boss that protrudes from a first long side of the cover wall 42, and midway over the length of the wall 42. Openings 46b, 46c are each formed through the flat lip 41 of the cover 40 between a first pair of notches 48 in the cover wall 42 that coincide with ports 24a, 28a in the wall 22 of the module base 20 when the cover 40 is fastened to the base to close the module, and between a second pair of notches in the cover wall 42 that coincide with ports 24b, 28c in the wall 22 of the module base when the module is closed. Openings 46d, 46e are formed through bosses that protrude from the second long side of the cover wall 42, near a third pair of notches 48 that coincide with fiber ports 28b, 28c in the wall 22 of the module base when the module is closed, and near a fourth pair of notches 48 that coincide with fiber ports 28d, 28e in the wall 22 of the module base 20 when the module is closed.

Once all fiber connections are made and managed over the interior surface 21 of the module base 20, the modules 10, 12 are closed by placing the cover 40 over the base 20 so that the wall 42 of the cover surrounds the wall 22 of the base, and the openings 46a to 46e in the cover wall 42 are in alignment with the openings 39a to 39e in the base wall 22. Threaded bolts 49 are inserted with associated flat washers 49a into the aligned openings, so that bolts 49 engage corresponding ones of the threaded sleeves 37 captured in the openings 39a-e in the base wall. The bolts 49 are tightened in a certain order and to a sufficient degree so that the interface between the cover 40 and the base 20 is properly sealed, as explained further below.

A channel 44 is formed to a depth of approximately 0.160 inch in the interior surface the cover lip 41, and parallel to the cover wall 42 as shown in FIG. 5. The bottom of the channel 44 defines a continuous and smooth sealing surface along which an oil resistant, O-ring sealing element 46 (see FIGS. 1 and 2) having an outer diameter of, e.g., 0.21 inch is disposed. A certain portion of the sealing element 46 is allowed to protrude above the channel 44. When the module cover 40 is fastened to the base 20 as explained above, the protruding sealing element 46 is urged against the top surface 23 of the base wall 22, and the entire sealing element is contained in a compressed state inside the channel 44. The interface between the interior surface of the cover lip 41 and the top surface 23 of the base wall 22 is thus sealed from the outdoor environment when the modules 10, 12 are closed.

Figure 6A:
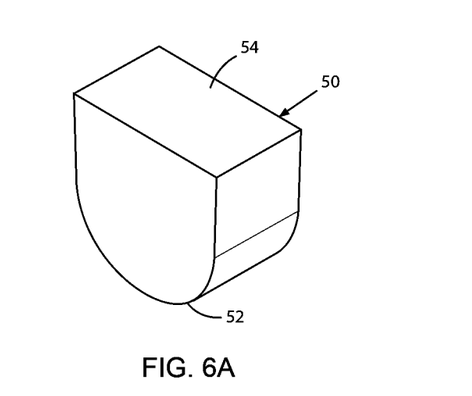
FIG. 6A is an isometric view of a seal for insertion in an unused fiber port of the modules to seal the port from the outdoor environment.

Each one of the fiber ports 28a to 28f also has an associated first seal or grommet 50 shown in FIG. 6A. Before the module cover 40 is fastened to the base 20, the seal 50 is dimensioned and formed to be urged into each unused fiber port (if any) from above, and to close the port fully with a tight fit. The seal has a lower rounded portion 52 that conforms to the rounded bottoms of the fiber ports. An upper flat surface 54 of the seal 50 rises slightly above the top surface 23 of the base wall 22 when the seal 50 is inserted in an unused port. The seal 50 is therefore compressed against a length of the sealing element 46 in the module cover 40 when the cover is fastened to the base 20, and the seal 50 cooperates with the sealing element 46 to seal the unused port from the outdoor environment. Each seal 50 can be formed of silicone that is UV and chemical resistant, and RoHS compliant. To facilitate installation of seal 50 in an unused fiber port, a thin film of silicone sealant can be applied on the lower rounded portion 54 of the seal.

Figure 6B:
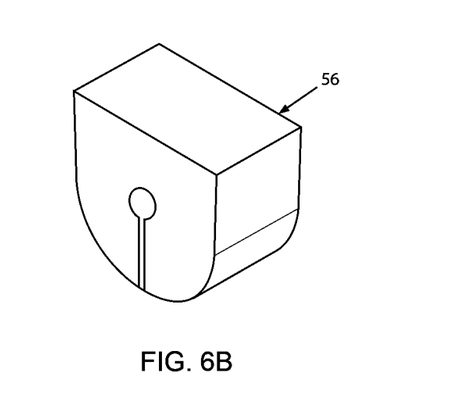
FIG. 6B is an isometric view of a second seal for enabling a cable to pass through a port of the modules while sealing the port from the outdoor environment.

The cable ports 24a, 24b, and each of the fiber ports 28a-f, also have associated second seals or grommets 56 shown in FIG. 6B. The second grommets 56 are similar in outside form to the first grommets 50, and have openings 58 dimensioned to pass the distribution cable and the drop fibers, and to surround the distribution cable and the drop fibers in sealing relationship when the grommet is urged with the distribution cable or a given drop fiber into a corresponding port.

To facilitate passing the cable or fiber through the second grommets 56, the grommets are split vertically through the center line of the lower rounded portions of the grommets. The upper flat portion of the grommet is not split. Like the first grommets 50, the top surfaces of the grommets 56 must be continuous, smooth, and flat for the cover sealing element 46 to seal against. The force of the module cover 40 against the base 20 when either module 10, 12 is closed, forces the slits in the second grommets 56 slits to close tightly.

The holes in the second grommets 56 are sized approximately 0.010 inch less than the nominal O.D. of the corresponding cable or fiber. Because of this, a slight bulge in the grommet will be produced when the cable or fiber is passed through the split to occupy the hole in the grommet. When the module 10 or 12 is closed and the sealing element 46 in the module cover 20 is forced down against the top of the second grommets 56, the bulge is compressed and the associated port is sealed water-tight from the outdoor environment.

Figure 7:
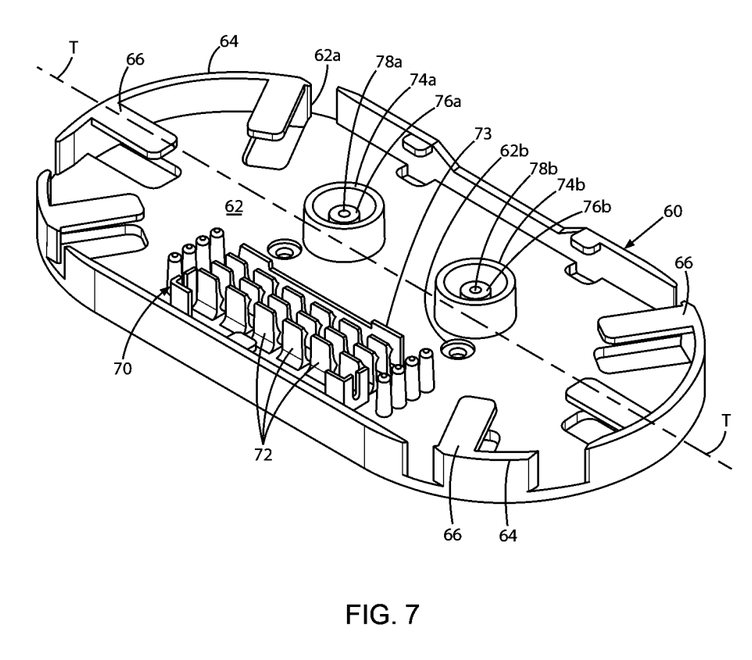
FIG. 7 is an enlarged view of a tray in the first embodiment of the module in FIG. 1.
Figure 8:
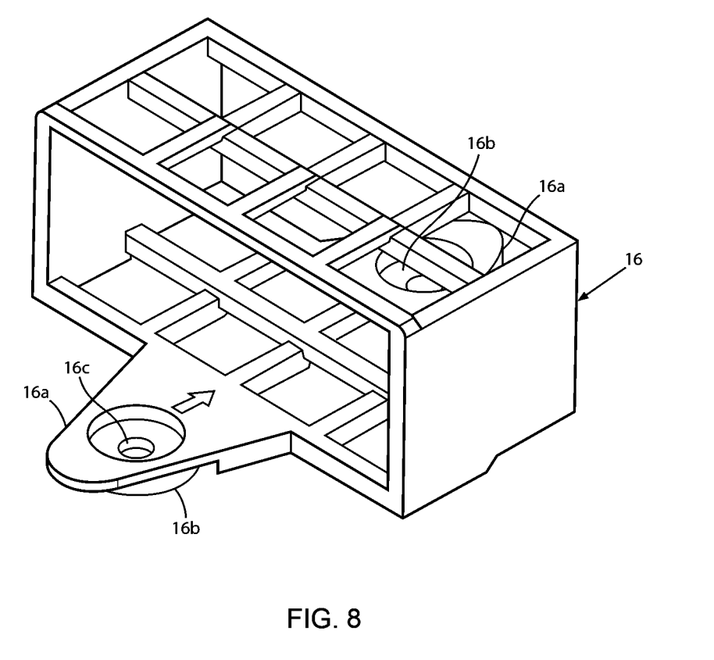
FIG. 8 is an enlarged view of an adapter holder in the first embodiment of the module in FIG. 1.

As disclosed earlier and shown in FIG. 1, module 10 is constructed to retain up to six fusion splices within 45 mm splice sleeves, and to mount up to four connector adapters 14 in an adapter holder 16. FIG. 7 is an enlarged view of a tray 60 in FIG. 1, wherein the tray 60 has a stadium shaped perimeter, and a floor 62 that is arranged to mount flush atop the circular boss 30 on the inside surface 21 of the module base 20. FIG. 8 is an enlarged view of the adapter holder 16 in FIG. 1. The tray 60 and the holder 16 can be made of RoHS compliant polypropylene or an equivalent material.

Two holes 62a, 62b that coincide with a long axis T of the tray 60 are formed in the floor 62 of the tray. The holes 62a, 62b are spaced apart by the same distance (e.g., approx. 1.639 in.) as are the holes in the bosses 36 on the wall segments 34 of the boss 30. The tray 60 is mounted on the boss 30 by inserting screws through the holes 62a, 62b, and threading them into the holes in the bosses 36.

Tray 60 has a surrounding wall 64 that extends upward from the perimeter of the tray floor 62 to a height of approximately 0.350 inch, and a number of retaining fingers or tabs 66 project radially inward from a top edge of the wall 64 to help contain cable and drop fibers that are connected to one another between the tray floor 62 and the top of the surrounding wall 64.

A fusion splice holder section 70 is provided in a central region of the tray floor 62, at one side of the long axis T. In the disclosed embodiment, the holder section 70 includes three parallel rows of retaining fingers or tabs 72 spaced approximately 0.106 inch apart from one another, and a parallel wall 73. Accordingly, splice holder section 70 is capable of retaining up to a total of six fusion splices, wherein each splice is protected inside a 45 mm long splice sleeve, and up to two splice sleeves can be inserted between and gripped by any two adjacent rows of the retaining tabs 72.

The tray 60 also has a first pair of annular bosses 74a, 74b that project from the tray floor 72 to a height of approximately 0.270 inch. The bosses 74a, 74b are offset a certain distance from the side of the long axis T opposite the splice holder section 70. A second pair of annular bosses 76a, 76b, each of smaller diameter and disposed concentrically inside the first pair, project to a lesser height of approx. 0.205 inch above the floor 72. Each boss of the second pair 76a, 76b has a corresponding hole 78a, 78b formed axially from the top, for mounting the adapter holder 16.

As shown in detail in FIG. 8, the adapter holder 16 has a generally rectangular, box-like shape which is formed and dimensioned to receive and retain four adapters 14 side-by-side as shown in FIG. 1. A pair of mounting feet 16a project from opposite sides of the holder 16. Each foot 16a has a cylindrical boss 16b that projects downward from the foot as viewed in FIG. 8, and each boss 16b has an axial mounting hole 16c. The distance between the two mounting holes 16c in the feet 16a of the adapter holder 16 is set equal to the distance between the mounting holes 78a, 78b in the second pair of bosses 76a, 76b on the tray 60. The adapter holder 16 is mounted on the tray 60 by centering the bosses 16b on the feet of the holder within the first pair of annular bosses 74a, 74b on the tray 60, inserting screws through the mounting holes 16c in the bosses, and threading the screws into the holes 78a, 78b in the bosses 76a, 76b on the tray 60.

Figure 9:
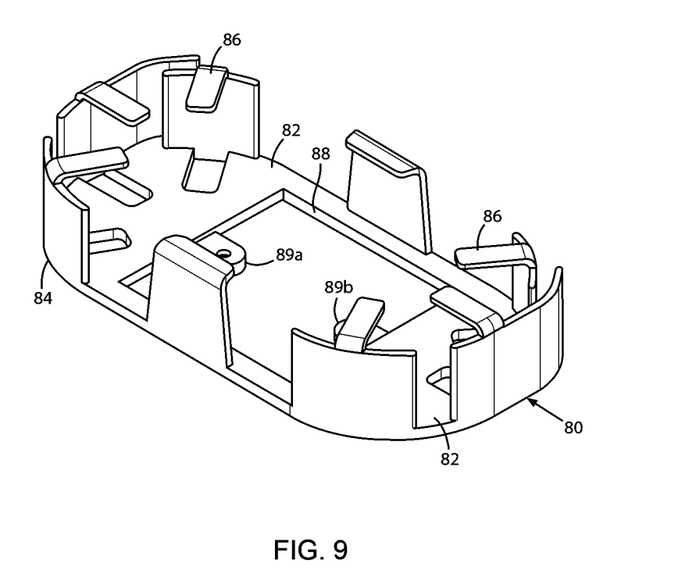
FIG. 9 is an enlarged view of a tray in the second embodiment of the module in FIG. 2.
Figure 10:
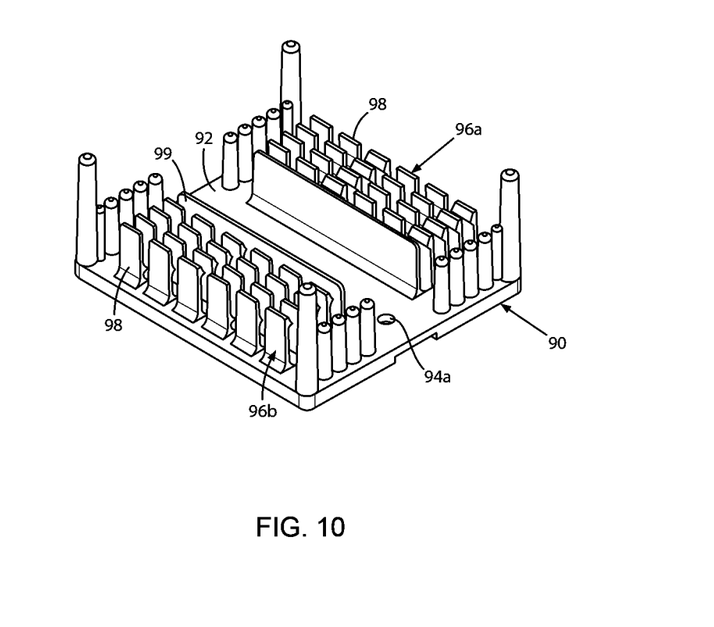
FIG. 10 is an enlarged view of a splice holder in the second embodiment of the module in FIG. 2.

As described earlier and shown in FIG. 2, module 12 is constructed to retain up to 24 fusion splices within 45 mm splice sleeves. FIG. 9 is an enlarged view of a tray 80 in FIG. 2, wherein the tray 80 has a stadium shaped perimeter, and a floor 82 that is configured to mount flush atop the circular boss 30 on the base 20 of the module 12. FIG. 10 is an enlarged view of a fusion splice holder or tray 90 in FIG. 2.

Tray 80 has a surrounding wall 84 that extends upward from the perimeter of the tray floor 82 to a height of approximately 1.010 inch, and a number of retaining fingers or tabs 86 that project radially inward from a top edge of the wall 84 to help contain cable and drop fibers that are spliced to one another between the tray floor 82 and the top of the surrounding wall 84. A rectangular opening 88 is formed through a central region of the tray floor 82, and a pair of mounting lugs 89a, 89b extend from opposite sides of the opening 88. When the tray 80 is placed atop the boss 30 on the module base 20, the lugs 89a, 89b have mountings holes located to coincide with the holes in the two bosses 36 inside the boss 30 on the module base 20.

Splice holder 90 has a rectangular base 92, with a pair of mounting holes 94a one of which is shown in the drawing. The holes 94a are located to coincide with the holes through the mounting lugs 89a, 89b on the tray 90. When the splice holder 90 is disposed within the rectangular opening 88 in the tray, the holder 90 and the tray 80 can be mounted together atop the boss 30 on the module base 20 by passing screws through the holes 94a in the holder base 92, through the openings in the mounting lugs 89a, 89b on the tray, and threading the screws into the two bosses 36 on the module base 20.

Two fusion splice holder sections 96a, 96b are formed atop the base 92 of the holder 90, on opposite sides of the openings 94a. Each section 96a, 96b includes five parallel rows of retaining fingers or tabs 98 wherein each row projects upward from the base 92 to a height of approximately 0.412 inch. Each row of tabs 98 is about 1.550 inches long, and the rows are spaced approximately 0.106 inch apart from one another. Accordingly, the splice holder sections 96a, 96b together are capable of retaining a total of 24 fusion splices, wherein each splice is protected inside a 45 mm long splice sleeve, and up to three splice sleeves can be inserted between and gripped by any two adjacent rows of the retaining tabs 96a, 96b.

While the foregoing represents preferred embodiments of the present invention, it will be understood by persons skilled in the art that various changes, modifications, and additions can be made without departing from the spirit and scope of the invention.

For example, instead of using the bolts 49 in the disclosed configuration to join the module cover 40 to the base 20, a lever action latching mechanism may be incorporated to facilitate the installation and closure of the modules 10, 12 in the field. Accordingly, the present invention includes all such changes, modifications, and additions that are within the scope of the following claims.

We claim:

1. An optical fiber distribution module comprising:
   a base;
   a cover;
   a sealing element disposed in the cover;
   the base has a surrounding wall, and a pair of cable ports formed in the wall at opposite sides of the base for passing a network distribution cable through the interior region of the module;
   one or more fiber ports formed in the wall of the base to pass corresponding drop fibers from the interior region of the module where the drop fibers can be connected to designated fibers of the distribution cable, to a number of premises inside a multi-dwelling unit (MDU) building for which the fibers are designated;
   first grommets associated with the fiber ports, wherein each first grommet is dimensioned and formed to be seated in an unused fiber port, and to cooperate with the sealing element in the cover when the cover is fastened to the base so that the port is sealed from the outdoor environment when the module is closed; and
   second grommets associated with the cable ports and the fiber ports, wherein each second grommet has a hole dimensioned to pass the distribution cable or a given drop fiber, and to surround the cable or the drop fiber in sealing relationship when the second grommet is urged with the cable or the drop fiber into a corresponding port, wherein the second grommets cooperate with the sealing element in the cover when the cover is fastened to the base so that the port is sealed from the outdoor environment when the module is closed;
   wherein the base has a raised boss formed on an interior surface of the base for defining a mounting platform for components of the module; and
   a tray constructed and arranged for mounting atop the raised boss on the interior surface of the module base, wherein the tray has a floor and a surrounding wall for containing fibers that are connected to one another between the floor and the top of the wall.

2. An optical fiber distribution module according to claim 1, wherein the floor of the tray is formed to have a fusion splice holder section including rows of tabs dimensioned and arranged for retaining a number of fusion splices, wherein each splice is surrounded by a sleeve and at least one sleeve can be inserted and gripped between any two adjacent rows of the tabs.

3. An optical fiber distribution module according to claim 2, including an adapter holder that is formed and dimensioned to receive and retain four adapters, wherein the adapter holder has a pair of mounting feet projecting from opposite sides of the holder, and the feet have mounting holes located to coincide with corresponding mounting holes formed on floor of the tray.

4. An optical fiber distribution module according to claim 1, wherein the floor of the tray has a generally rectangular opening and a pair of mounting lugs extending from opposite sides of the opening, and wherein the lugs have mounting holes located to coincide with the holes in the two bosses on the wall segments on the interior surface of the module base.

5. An optical fiber distribution module according to claim 4, including a splice holder having a generally rectangular base with a pair of mounting holes located to coincide with the mounting holes in the pair of mounting lugs on the tray.

6. An optical fiber distribution module according to claim 5, including a splice holder having a generally rectangular base dimensioned and arranged to be disposed within the rectangular opening in the floor of the tray, so that the splice holder and the tray can be mounted together atop the boss on the interior surface of the module base.

7. An optical fiber distribution module according to claim 6, wherein the base of the splice holder has two fusion splice holder sections, and each section includes rows of tabs dimensioned and arranged for retaining a number of fusion splices, wherein each splice is surrounded by a sleeve and at least one sleeve can be inserted and gripped between any two adjacent rows of the tabs.

8. An optical fiber distribution module according to claim 1, wherein each second grommet has a lower portion that is split vertically to enable a given cable or fiber to be urged vertically through the lower portion of the grommet and to occupy the opening in the grommet.

9. An optical fiber distribution module according to claim 8, wherein the holes in the second grommets are sized approximately 0.010 inch less than a nominal O.D. of a corresponding cable or fiber.

10. An optical fiber distribution module according to claim 1, wherein the raised boss is defined by two concentric circular rings, and wall segments that extend radially between the rings.

11. An optical fiber distribution module according to claim 10, wherein two of the wall segments of the boss are formed with bosses that have holes for engaging mounting screws associated with certain interior components of the module.

12. An optical fiber distribution module according to claim 11, wherein the two wall segments are spaced approximately 180 degrees apart from one another.

* * * * *